US009954675B2

(12) United States Patent
Ditterich et al.

(10) Patent No.: US 9,954,675 B2
(45) Date of Patent: Apr. 24, 2018

(54) TRANSMISSION OF ACTUATION SIGNALS AND DATA SIGNALS (71) Applicant: Siemens Aktiengesellschaft, München (DE)

(72) Inventors: Jürgen Ditterich, Nürnberg (DE); Rüdiger Kleffel, Erlangen (DE); Frank Kleindienst, Glauchau (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/532,874

(22) PCT Filed: Nov. 19, 2015

(86) PCT No.: PCT/EP2015/077073
§ 371 (c)(1),
(2) Date: Jun. 2, 2017

(87) PCT Pub. No.: WO2016/087217
PCT Pub. Date: Jun. 9, 2016

(65) Prior Publication Data
US 2017/0366336 A1 Dec. 21, 2017

(30) Foreign Application Priority Data
Dec. 5, 2014 (EP) ..................... 14196554

(51) Int. Cl.
*H04L 7/04* (2006.01)
*H02P 27/06* (2006.01)
(Continued)

(52) U.S. Cl.
CPC .............. *H04L 7/044* (2013.01); *H02P 27/06* (2013.01); *H04J 3/0658* (2013.01); *H04J 3/10* (2013.01);
(Continued)

(58) Field of Classification Search
CPC ........ H04L 7/044; H04L 7/0331; H02P 27/06; H04J 3/0658; H04J 3/10
(Continued)

(56) References Cited

U.S. PATENT DOCUMENTS 6,373,299 B1 4/2002 Strecker
9,053,869 B2 6/2015 Kleffel
(Continued)

FOREIGN PATENT DOCUMENTS

DE 102011014753 A1 9/2012
DE 102012211312 A1 1/2014
(Continued)

*Primary Examiner* — Allen T Cao
(74) *Attorney, Agent, or Firm* — Henry M. Feiereisen LLC (57) ABSTRACT The invention relates to a method for transmitting an actuation signal and a first data signal between a control device and an actuation device of a power semiconductor device. To minimize the expenditure for the operation of the physical transmission channels and the costs for the laying of the physical connection between control device and actuation device, the transmission of the actuation signal and the first data signal between the control device and the actuation device takes place simultaneously and via a common transmission channel, wherein the first data signal is combined with the actuation signal by means of a digital modulation method or coding method. A feedback signal and second data signal are transmitted in the opposite direction. A first coding length is shorter than the interval length of the actuation signal. A second coding length is shorter than the interval length of the feedback signal.

20 Claims, 4 Drawing Sheets (51) Int. Cl.
*H04J 3/10* (2006.01)
*H04Q 9/04* (2006.01)
*H04J 3/06* (2006.01)
*H04L 7/033* (2006.01)
*H04L 29/08* (2006.01)

(52) U.S. Cl.
CPC ............ *H04L 7/0331* (2013.01); *H04Q 9/04* (2013.01); *H04L 67/12* (2013.01); *H04Q 2209/845* (2013.01)

(58) Field of Classification Search
USPC .................................................. 340/3.2–3.24
See application file for complete search history.

(56) References Cited

U.S. PATENT DOCUMENTS

| | | | | |
|---|---|---|---|---|
| 9,337,934 B1* | 5/2016 | Agazzi | ................... | H04B 10/61 |
| 2002/0160816 A1* | 10/2002 | Vitallo | ................... | H04B 1/082 |
| | | | | 455/566 |
| 2004/0208571 A1* | 10/2004 | Shahar | ................. | G02B 6/2861 |
| | | | | 398/79 |
| 2009/0075603 A1* | 3/2009 | Li Puma | ................ | H04B 1/034 |
| | | | | 455/76 |

FOREIGN PATENT DOCUMENTS

| | | | |
|---|---|---|---|
| EP | 2371054 A2 | 10/2011 | |
| WO | WO 2010/060585 A2 | 6/2010 | |

* cited by examiner

TRANSMISSION OF ACTUATION SIGNALS AND DATA SIGNALS

CROSS-REFERENCES TO RELATED APPLICATIONS

This application is the U.S. National Stage of International Application No. PCT/EP2015/077073, filed Nov. 19, 2015, which designated the United States and has been published as International Publication No. WO 2016/087217 and which claims the priority of European Patent Application, Serial No. 14196554.1, filed Dec. 5, 2014, pursuant to 35 U.S.C. 119(a)-(d).

BACKGROUND OF THE INVENTION

The invention relates to a method for transmitting an actuation signal and a first data signal between a control device and an actuation device for a power semiconductor device.

The invention relates, moreover, to an arrangement for carrying out a method of this kind.

The invention relates, moreover, to a system for the digital transmission of at least one actuation signal and at least one first data signal between a control device and an actuation device and for the digital transmission of at least one feedback signal together with at least one second data signal in the opposite direction with at least one arrangement of this kind.

A method of this kind is used in the actuation of power semiconductors, in particular in power converters. Possible applications are: electric drives, wind power systems, rail systems and power engineering. Two different types of signal are to be transmitted via the interface between control device and actuation device:

time-deterministic real-time signals for actuation of the power semiconductors and their feedback, and
 data signals having additional information, for example for parameterization, diagnosis and transmitting measured values.

The time-deterministic real-time signals cannot be changed in terms of their form and are delayed by only a low, precisely defined amount, namely the duration of the transmission path.

The two items of information must not influence each other. Due to the high temporal requirements in the case of protective measures of the control device or in the case of applications with a high switching frequency of the power semiconductor device, the frequency of the actuation and feedback signals can and must be higher than the data transfer rate of the additional information.

Previously, owing to the specific signal requirements, two different physical transmission channels were used. A physical transmission channel is a connection with which metrologically detectable signals are transmitted. In this case the two different physical transmission channels are, for example, two different cables which do not influence each other. A connection by way of fiber optic cables or a wireless connection is likewise a physical transmission channel. Since the signals on the two cables do not influence each other, transmission takes place via two different transmission channels.

The above-described, conventional solution for transmission is connected with additional expenditure for the operation of two different transmission channels and costs for the laying of the physical connections between control device and actuation device. Transmission of the actuation signals and feedback signals within a data protocol of known data interfaces, such as for example Ethernet, Local Operating Network (LON), Controller Area Network (CAN), Universal Serial Bus (USB), is not possible owing to the time-deterministic real-time requirements of the actuation and feedback signal.

A converter for feeding a motor is known from EP 2 371 054 A2, wherein a first interface is provided for signal transmission between an electronic control module and a coupling module, and a second interface is implemented for signal transmission between a coupling module and a brake chopper module and between a coupling module and each phase module respectively.

DE 10 2011 014 753 A1 discloses a drive system and method for operating a drive system which has at least one electric motor which is fed by a converter. At least one sensor and one actuator are arranged on the motor, wherein the converter and the motor are connected by a hybrid cable. The hybrid cable has heavy current lines and weak current lines, wherein at least two signal lines and two supply lines are used as the weak current lines. The values detected by the sensors and, in particular at different times, the actuation data determined for the actuator can be transmitted via the signal lines.

WO 2010/060585 A2 discloses a converter for feeding a motor which discloses an electronic control module for generating actuation signals for actuatable semiconductor switches, in particular power semiconductor switches and phase modules connected to one motor feed line respectively, comprising semiconductor switches and a brake chopper module with actuatable semiconductor switches, wherein a first interface is provided for signal transmission between the electronic control module and a coupling module, and a second interface for signal transmission is implemented for signal transmission between the coupling module and the brake chopper module and between the coupling module and each phase module respectively.

DE 10 2012 211 312 A1 discloses a method for the simultaneous transmission of at least two high-frequency transmission signals via a common high-frequency line by providing at least two input signals at respective input ports for the transmission of high-frequency signals of a magnetic resonance scanner, wherein the input signals are signals with the same carrier frequency.

SUMMARY OF THE INVENTION

The invention is based on the object of disclosing a method of the type mentioned in the introduction in which the expenditure for the operation of the physical transmission channels and the costs for the laying of the physical connection between control device and actuation device are minimized.

This object is inventively achieved by a method of the type mentioned in the introduction in that the transmission of the actuation signal and first data signal takes place simultaneously and via a common transmission channel, wherein the first data signal is combined with the actuation signal by means of a digital modulation method or coding method.

A linking of this kind can be carried out, for example, by way of a mixing process. The information is completely recovered at the receiving-side by a demodulator or decoder.

The actuation signal and first data signal are transmitted via a common physical transmission channel. This can be, for example, a cable but also a fiber optic cable. Since the time-deterministic real-time requirements for the actuation signal have to be observed, transmission must take place simultaneously. This requirement is not met, for example by a conventional time-multiplex method in which different signals are transmitted independently of each other in different time intervals.

The advantages of the invention manifest themselves, for example in a cable connection, in that during transmission of the actuation signal, which can be, for example, a switching signal, together with the first data signal, and during transmission of the feedback signal together with the second data signal, one cable is omitted in each case and the expenditure for the operation of the interfaces is minimized accordingly. The costs for the laying of the cable between control device and actuation device are likewise reduced. A further advantage is that the number of mechanical error sources is decreased as a result of the reduction in the number of required plug-in connections compared to the prior art and crosstalk between actuation signal and first data signal or between feedback and second data signal does not apply by nature.

The object is inventively achieved, moreover, by an arrangement for carrying out a method of this kind, wherein the arrangement has a transmitter, a transmission channel and a receiver.

This arrangement is advantageous since no additional interface is required for the transmission of the additional information and the expenditure and the costs are significantly reduced compared to a separate physical interface.

Furthermore, the object is inventively achieved by system for the digital transmission of at least one actuation signal and at least one first data signal between a control device and an actuation device and for the digital transmission of at least one feedback signal together with at least one second data signal in the opposite direction with at least one arrangement of this kind, wherein the actuation device is provided to actuate a power semiconductor device with an analog actuation signal.

The actuation signal and the first data signal are advantageously approximately in the form of a rectangle. The actuation signal and the first data signal preferably have two different signal levels which correspond, for example, to a "low" and a "high" level or an "on/off" level or a logic "0" and a logic "1". This is particularly advantageous since a combination of, for example, the actuation signal with the first data signal is easy and inexpensive to implement so as to be power efficient.

In a preferred embodiment a feedback signal together with a second data signal is also transmitted in the opposite direction. A feedback signal can be generated, for example, by a monitoring sensor which monitors a power semiconductor device. One advantage of this embodiment consists in that no additional physical transmission channel is required for the transmission of the additional information and the expenditure and the costs are significantly reduced compared to separate transmission of the feedback signal and the second data signal.

The actuation signal is particularly advantageously transmitted at a higher data rate than the first data signal and/or the feedback signal is transmitted at a higher data rate than the second data signal. The coding length is preferably smaller than the interval length, wherein the transmission period comprises at least two interval lengths. This has the advantage that the time-deterministic real-time requirements for the actuation signal and the feedback signal are observed.

In a preferred embodiment a coding length is used for the first data signal which is shorter than the interval length of the actuation signal is and/or a coding length is used for the second data signal which is shorter than the interval length of the feedback signal. The coding length describes the length of a bit of the first or second data signal here.

Since the change in the actuation signals and feedback signals can only occur at discrete times, a constant interval length results for the actuation signal and the feedback signal, with no changes occurring within the interval. This is particularly advantageous since the actuation signal and the feedback signal can be reconstructed completely and in an unaltered manner.

The transmission period comprises at least two interval lengths.

In an advantageous embodiment the first data signal is combined with an actuation signal and/or the second data signal is combined with a feedback signal using an XOR operation or an XNOR operation. The abbreviations XOR and XNOR originate from combinatorics, wherein an XOR operation is an abbreviation for an exclusive OR operation is and an XNOR operation is an abbreviation for an exclusive NOT-OR operation.

With a XOR or XNOR operation an actuation signal having a first data signal and a feedback signal having a second data signal are logically linked together by an XOR operation or XNOR operation within the coding length. This has the advantage that a logic operation of this kind is easy and inexpensive to implement so as to be power efficient with the aid of an appropriate gate.

The data signal is particularly advantageously coded with the aid of pulse phase coding and/or pulse width coding, in particular by inversion.

With pulse phase coding or pulse phase modulation, PPM for short, or even pulse position coding, the coding length is inserted at different coding times within the transmission period as a function of the value of the first data signal or second data signal. The actuation signal and the feedback signal are inverted within the coding length.

With pulse width coding or pulse width modulation, which is also called pulse length modulation or pulse width modulation, the coding length is changed within the transmission period as a function of the value of the first data signal or second data signal. The actuation signal or the feedback signal, respectively, are inverted within the coding length.

Any combinations of the coding variants are possible.

Multivalent first or second data signals and/or a plurality of first or second data signals can therefore be coded.

In a preferred embodiment a plurality of first data signals is combined with an actuation signal and/or a plurality of second data signals is combined with a feedback signal. These data signals can be dependent on each other or be independent of each other. Dependent data signals have the advantage that multivalent information can be transmitted. Independent data signals have the advantage that additional information from a plurality of data sources can be transmitted simultaneously.

In an advantageous embodiment a data protocol is formed from the data signals of a plurality of transmission periods. A transmission period is the linking of a plurality of intervals for the transmission of one or more items of digital information. The use of a data protocol increases the reliability of the linking since using the protocol it can be determined whether all of the information has arrived and whether there are any errors.

In a further embodiment the transmitter has a mixing device which is provided for combination of the actuation signal with at least one first data signal or of the feedback signal with at least one second data signal. This is particularly advantageous because this architecture is easy and inexpensive to implement in hardware.

In a particularly advantageous embodiment the receiver has a device which is provided for detection of a synchronization time, at least one bit detection unit which is provided for recovering and outputting the data signal, an actuation detection unit which is provided for recovering and outputting the actuation signal or feedback signal and a phase-locked loop which is provided for supplying a reference time for the actuation detection unit and the bit detection unit. This implementation has the advantage that the receiver can synchronize with the transmitter solely with the aid of the coded signal and therefore an additional synchronization line is omitted.

BRIEF DESCRIPTION OF THE DRAWING

The invention will be described and explained in more detail below using the exemplary embodiments illustrated in the figures. In the drawings.

DETAILED DESCRIPTION OF PREFERRED EMBODIMENTS

Figure 1:
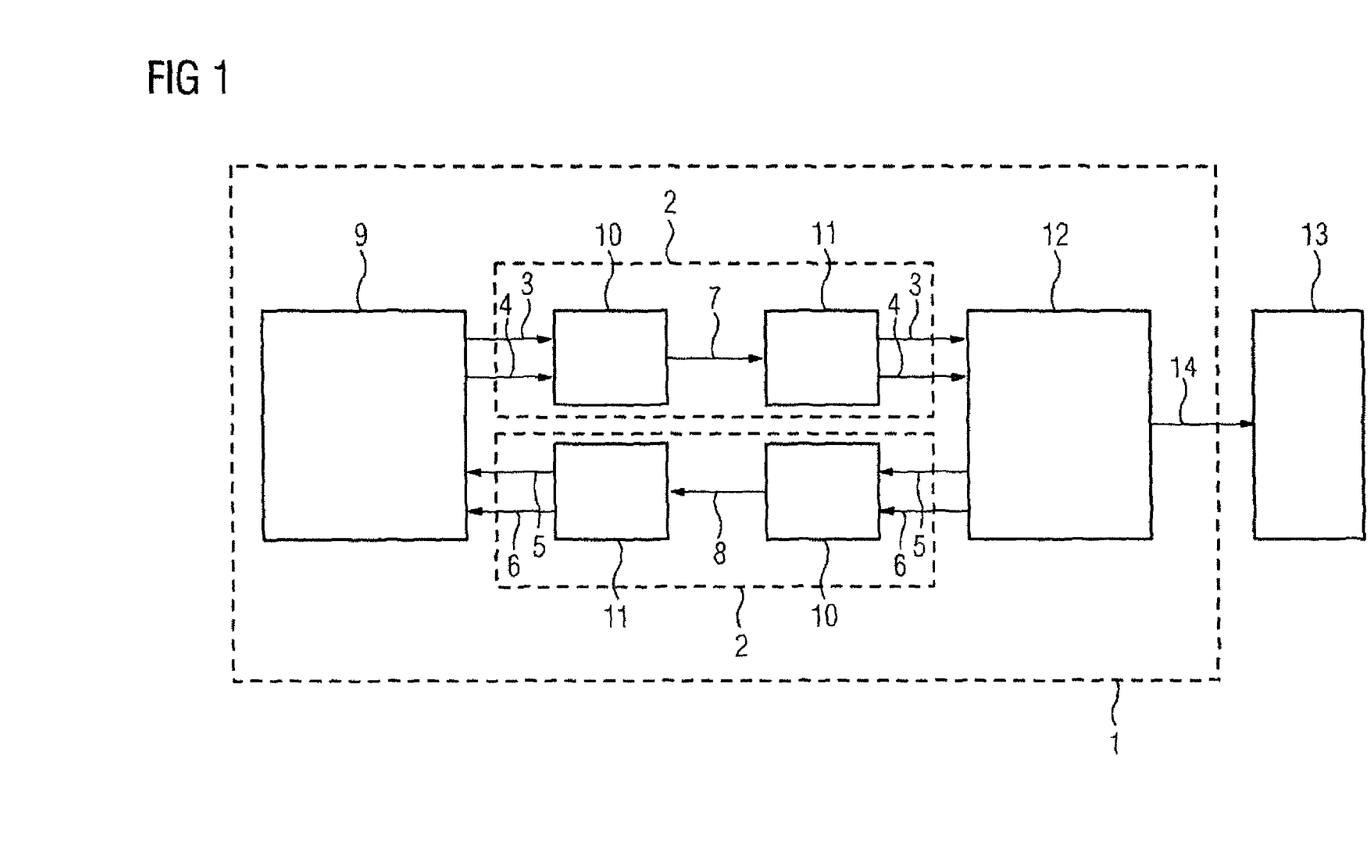
FIG. 1 shows a schematic diagram of a system for actuation of a power semiconductor device.

FIG. 1 shows a schematic diagram of a system 1 for the actuation of a power semiconductor device 13 which has a control device 9, an actuation device 12, a power semiconductor device 13 and two arrangements 2 for coding an actuation signal 3 or a feedback signal 6 each with one data signal 4, 5. Each arrangement comprises a transmitter 10 and a receiver 11. The actuation signal 3 and the first data signal 4 are generated by the control device 9 and combined by the transmitter 10 to form a first coded signal 7. The actuation signal 3 and the first data signal 4 are reconstructed from this signal 7 by the receiver 11. The actuation signal 14 is fed to the power semiconductor device 13 with the aid of the actuation device 12. The feedback signal 6 of the actuation device 12 of the power semiconductor device 13 is combined together with a second data signal 5 from a transmitter 10 to form a second coded signal 8. The feedback signal 6 and the second data signal 5 are reconstructed from this signal 8 by the receiver 11 and fed back to the control device for further processing.

Figure 4:
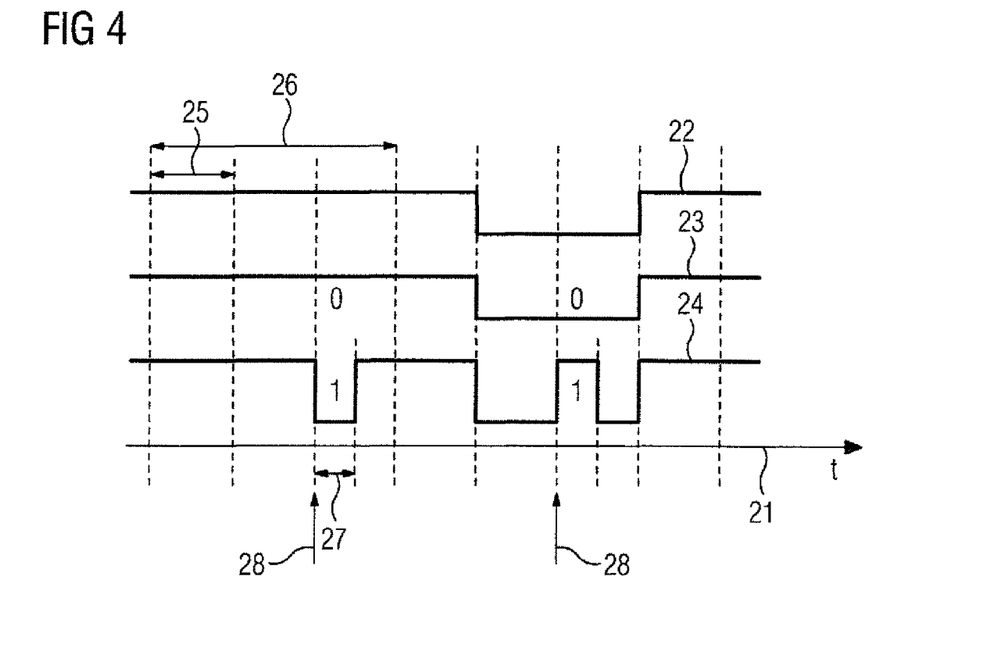
FIG. 4 shows a timing diagram for coding an uncoded actuation signal or feedback signal each with one data signal by means of an XOR operation.
Figure 5:
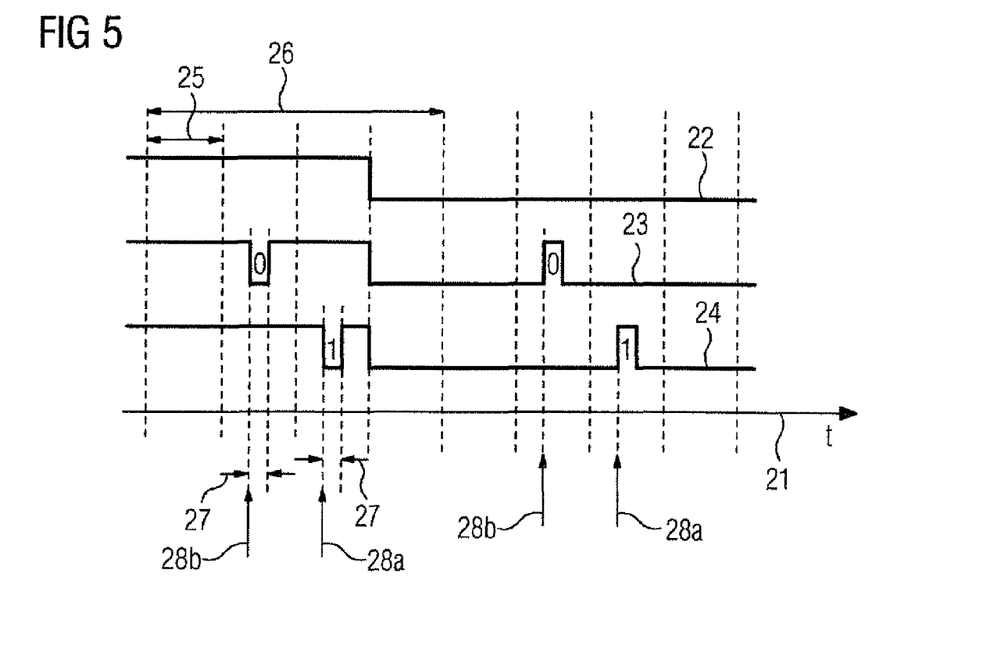
FIG. 5 shows a timing diagram for coding an uncoded actuation signal or feedback signal each with one data signal by means of pulse phase coding.
Figure 6:
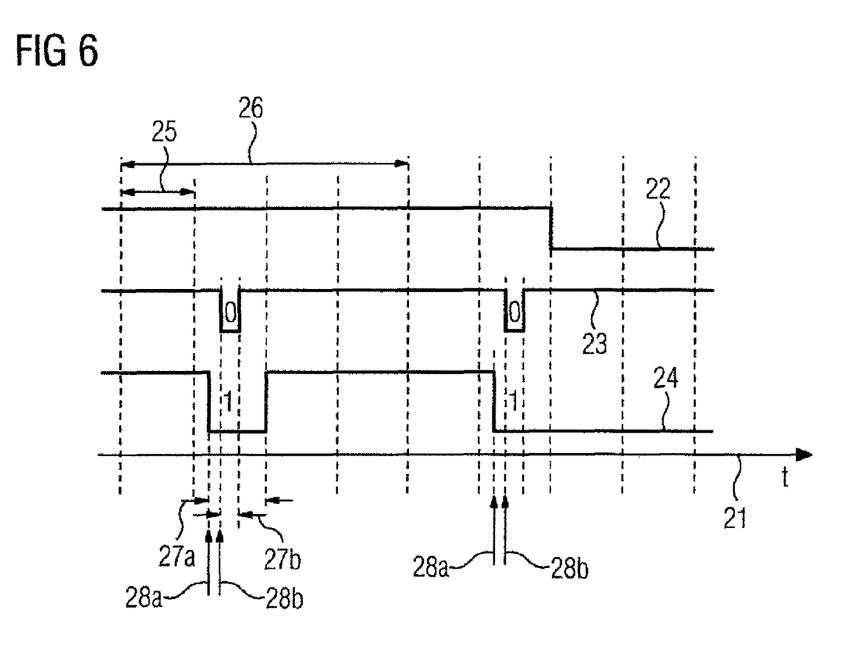
FIG. 6 shows a timing diagram for coding an uncoded actuation signal or feedback signal each with one data signal by means of pulse width coding.

For modulation or mixing of the signals 3, 4, 5, 6 the following modulation variants or coding variants can be used in this method, cf. in this regard FIGS. 4 to 6: an XOR or XNOR operation, pulse phase coding and pulse width coding. For all three coding variants:
the coding length 27, 27a, 27b is shorter than the interval length 25.
the transmission period 26 comprises at least two interval lengths 25.

With an XOR or XNOR operation, an actuation signal 3 with a first data signal 4 and a feedback signal 6 with a second data signal 5 are logically linked to each other by an XOR operation or XNOR operation within the coding length 27.

With pulse phase coding, the coding length 27 is inserted at different coding times 28a, 28b within the transmission period as a function of the value of the first data signal 4 or second data signal 5. The actuation signal 3 and the feedback signal 6 are inverted within the coding length 27.

With pulse width coding the coding length 27a, 27b is changed within the transmission period as a function of the value of the first data signal 4 or second data signal 5. The actuation signal 3 and the feedback signal 6 are inverted within the coding length 27a, 27b.

Any combinations of the coding variants are possible. Multivalent first or second data signals and/or a plurality of first or second data signals can be coded thereby.

Figure 2:
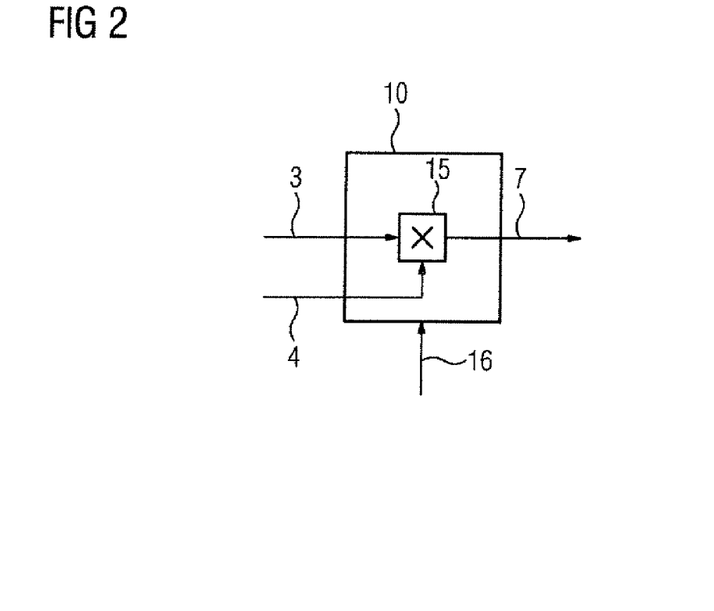
FIG. 2 shows a schematic diagram of a transmitter.

FIG. 2 shows a schematic diagram of a transmitter 10 which has a mixing device 15. Coding of the first coded signal 7 comprising an actuation signal 3 and a first data signal 4 is illustrated by way of example. An actuation signal 3 and a first data signal 4 are fed to the mixing device 15 and combined to form a first coded signal 7. In addition, a reference clock 16 is supplied.

The second coded signal 8 is generated from the feedback signal 6 and the second data signal 5 in the same way.

Figure 3:
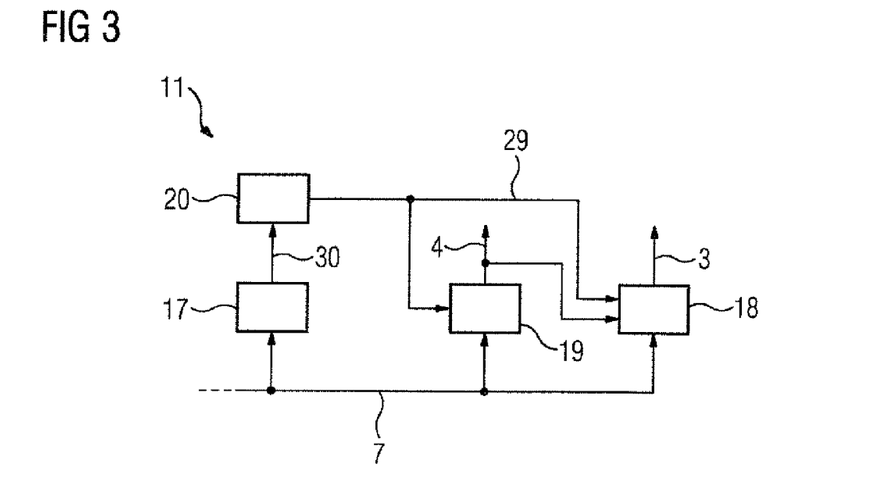
FIG. 3 shows a schematic diagram of a receiver.

FIG. 3 illustrates a schematic diagram of a receiver 11. The actuation signal 3 or the feedback signal 6 and a data signal 4, 5 are obtained in the receiver from a coded signal 7, 8. The coded signal 7, 8 is sampled and processed for this purpose.

The receiver is composed of a device for detecting the synchronization time 17, a phase-locked loop 20, an actuation detection unit 18 and a bit detection unit 19.

The reconstruction of the actuation signal 3 and first data signal 4 from the first coded signal 7 is illustrated by way of example. The first coded signal 7 is simultaneously fed to the device for detection of the synchronization time 17, to the actuation detection unit 18 and to the bit detection unit 19. For detection of the synchronization time 17 the device detects an appropriate synchronization time 30 which feeds a phase-locked loop 20. The output signal of the phase-locked loop 20 supplies a reference time 29 for the actuation detection unit 18 and the bit detection unit 19. The actuation signal 3 is recovered from the first coded signal 7 and the first data signal 4 is recovered from the bit detection unit 19 by the actuation detection unit 18 by way of example.

The feedback signal 6 and the second data signal 5 are reconstructed from the second coded signal 8 in the same way.

In FIG. 4 illustrates a timing diagram for coding an uncoded actuation signal or feedback signal 22, each having one data signal, by means of an XOR operation. The uncoded actuation signal or feedback signal 22 runs along the time axis 21 and is divided into a plurality of intervals 25 within a transmission period 26. The additional information is coded for the values "0" or "1" at the same times in the transmission period by an XOR operation. Alternatively, the coding can occur with an XNOR operation. In accordance with the truth tables for the XOR operation the signal characteristic does not change in the case of coding with "0" 23 at the coding time 28. The signal characteristic in the case of coding with "1" 24, by contrast, is inverted at the coding time 28 for a constant coding length 27.

FIG. 5 shows a timing diagram for coding an uncoded actuation signal or feedback signal 22 each having one data signal by means of pulse phase modulation, also called pulse phase coding. With this coding variant, the coding time 28 varies while the coding length 27 remains constant. The signal characteristic in the case of coding with "0" 23 is inverted at the coding time for "0" 28*b* for a coding length 27, the signal characteristic in the case of coding with "1" 24 is inverted at the coding time for "1" 28*a* for the same coding length 27.

FIG. 6 shows a timing diagram for coding an uncoded actuation signal or feedback signal 22 each having one data signal by means of pulse width modulation, also called pulse width coding. With this coding variant, the signal characteristic is inverted at coding time 28 in each case. The signal characteristic in the case of coding with "0" 23 and the signal characteristic in the case of coding with "1" 24 differ in the coding length 27. In addition, the coding time 28 can optionally be varied. The signal characteristic in the case of coding with "0" 23 is inverted at the coding time for "0" 28*b* for the coding length for "0" 27*b*, the signal characteristic in the case of coding with "1" 24 is inverted at the coding time for "1" 28*a* for the coding length for "1" 27*a*.

To summarize, the invention relates to a method for transmitting an actuation signal 3 and a first data signal 4 between a control device 9 and an actuation device 12 of a power semiconductor device 13. To minimize the expenditure for the operation of the physical transmission channels and the costs for the laying of the physical connection between control device 9 and actuation device 12, it is proposed that transmission of the actuation signal 3 and first data signal 4 takes place simultaneously and via a common transmission channel, wherein the first data signal 4 is combined with the actuation signal 3 by means of a digital modulation method or coding method.

What is claimed is:

1. A method for transmitting an actuation signal and a first data signal between a control device and an actuation device for a power semiconductor device, said method comprising:
   transmitting the actuation signal and the first data signal from the control device to the actuation device simultaneously and via a common transmission channel;
   combining the first data signal with the actuation signal by means of a digital modulation method or coding method;
   transmitting a feedback signal together with a second data signal in the opposite direction;
   using a first coding length which is shorter than the interval length of the actuation signal for the first data signal; and
   using a second coding length which is shorter than the interval length of the feedback signal for the second data signal.

2. The method of claim 1, wherein the actuation signal and the first data signal are approximately in the form of a rectangle.

3. The method of claim 1, wherein the feedback signal and the second data signal are approximately in the form of a rectangle.

4. The method of claim 1, further comprising combining the second data signal with the feedback signal by the digital modulation method or the coding method.

5. The method of claim 1, wherein the actuation signal is transmitted at a higher data rate than the first data signal and/or the feedback signal is transmitted at a higher data rate than the second data signal.

6. The method of claim 1, wherein the first data signal is combined with the actuation signal using an XOR operation or an XNOR operation.

7. The method of claim 1, wherein the second data signal is combined with the feedback signal using an XOR operation or an XNOR operation.

8. The method of claim 1, wherein the first data signal is coded with the aid of pulse phase coding and/or pulse width coding, in particular by inversion.

9. The method of claim 1, wherein the first data signal is coded with the aid of pulse phase coding and/or pulse width coding by inversion.

10. The method of claim 1, wherein the second data signal is coded with the aid of pulse phase coding and/or pulse width coding, in particular by inversion.

11. The method of claim 1, wherein the second data signal is coded with the aid of pulse phase coding and/or pulse width coding by inversion.

12. The method of claim 1, wherein a plurality of first data signals is combined with the actuation signal.

13. The method of claim 1, wherein a plurality of second data signals is combined with the feedback signal.

14. The method of claim 1, wherein a multivalent first data signal is combined with the actuation signal.

15. The method of claim 1, wherein a multivalent second data signal is combined with the feedback signal.

16. The method of claim 1, further comprising transmitting digital information and/or data protocols.

17. An arrangement, comprising:
   a transmitter including a mixing device provided for combining an actuation signal with a first data signal and for combining a feedback signal with a second data signal;
   a transmission channel provided for transmitting the combination of the actuation signal with the first data signal and transmitting receiving the combination of the feedback signal with the second data signal; and
   a receiver provided for receiving the combination of the actuation signal with the first data signal and for receiving the combination of the feedback signal with the second data signal.

18. The arrangement of claim 17, wherein the receiver comprises a device for detecting the synchronization time, a bit detection unit which is provided for recovering and outputting the first data signal and second data signal, an actuation detection unit which is provided for recovering and outputting the actuation signal and the feedback signal, and a phase-locked loop which is provided for supplying a reference time for the bit detection unit and the actuation detection unit.

19. A system, comprising:
   a control device;
   an actuation device interacting with the control device for digital transmission of an actuation signal and a first data signal in one direction and for digital transmission of a feedback signal together with a second data signal in another direction opposite to the one direction;
   an arrangement a transmitter including a mixing device provided for combining an actuation signal with a first data signal and for combining a feedback signal with a second data signal, a transmission channel provided for transmitting the combination of the actuation signal with the first data signal and transmitting receiving the combination of the feedback signal with the second data signal, and a receiver provided for receiving the combination of the actuation signal with the first data signal and for receiving the combination of the feedback signal with the second data signal; and
   a power semiconductor device actuated by the actuation device with an analog actuation signal.

20. The system of claim 19, wherein the power semiconductor device has a power converter.

\* \* \* \* \*